UNITED STATES PATENT OFFICE.

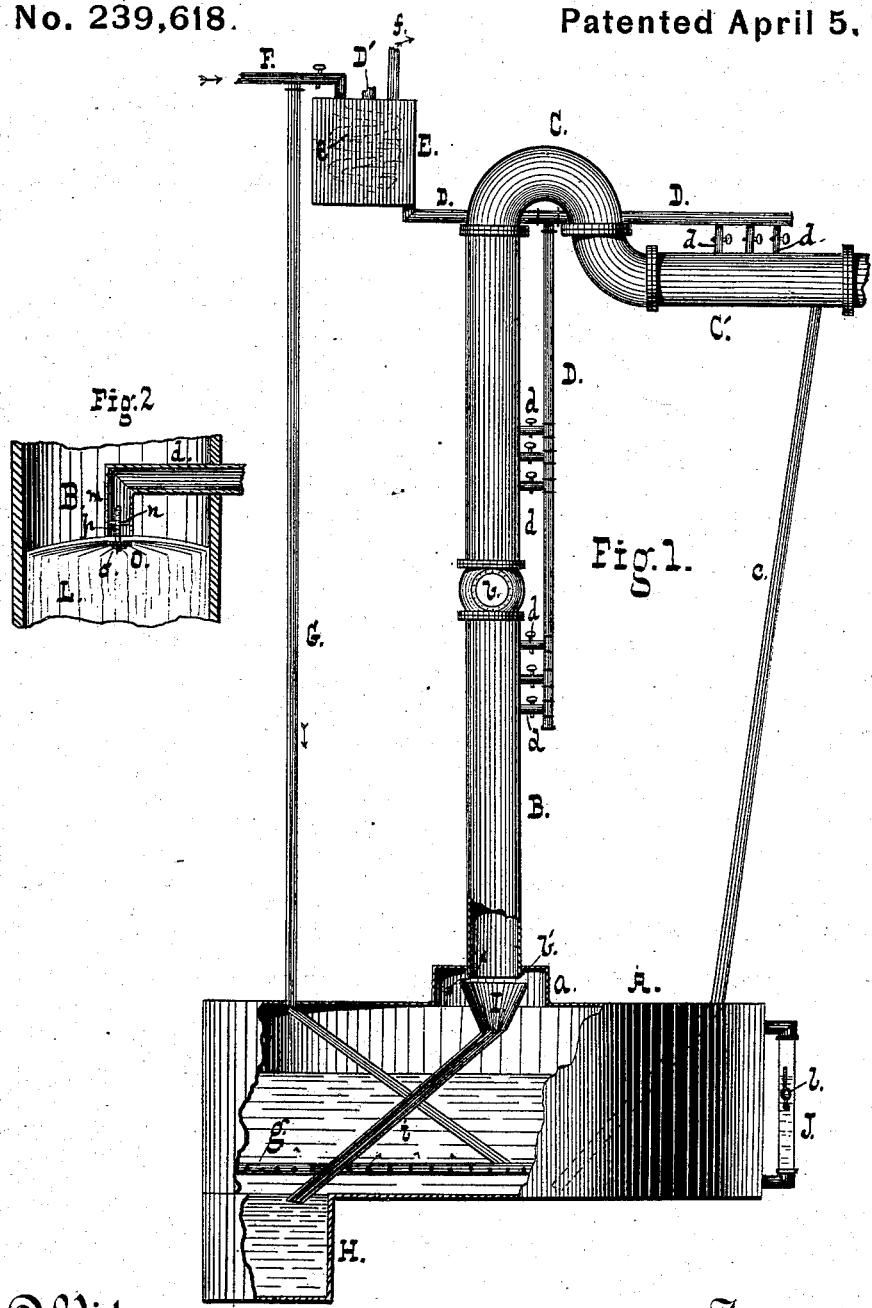

ALBERT NEILSON, OF BALTIMORE, MARYLAND.

PROCESS OF AND APPARATUS FOR DISTILLING PETROLEUM PRODUCTS.

SPECIFICATION forming part of Letters Patent No. 239,618, dated April 5, 1881.

Application filed December 7, 1880. (No model.)

*To all whom it may concern:*

Be it known that I, ALBERT NEILSON, of Baltimore city, State of Maryland, have invented certain new and useful Improvements in the Process of and Apparatus for Distilling Petroleum Products; and I hereby declare the same to be fully, clearly, and exactly described as follows, reference being had to the accompanying drawings, in which—

Figure 1 is a side elevation of the still, a part of the same being broken away to show features of internal construction, and Fig. 2 is a central sectional view of a part of the column.

My invention relates to the separation, by distillation, of the products of petroleum. This substance, in its crude state, consists of a number of distinct and well-defined hydrocarbons, differing chemically both as to their empyrical and rational formulæ, and possessing widely-different physical characteristics. They may be separated in many ways; but in practice the only method resorted to is distillation. By fractional distillation a comparatively-quantitative separation of the various constituents of petroleum is feasible; but such a method is, of course, too costly to be practiced on a commercial scale, and, as a result, the substances known to commerce as "benzine," "naphtha," "kerosene," or "illuminating-oil," as distilled from crude petroleum, are quite complex in composition.

The object of my invention is to effect a more perfect separation of these bodies into their constituent compounds, and approximate more nearly to homogeneity in the several distillates, than has heretofore been possible.

In practice the crude petroleum is subjected to distillation until the liquid going over is of a gravity approximately 60° Baumé. This distillate consists of all hydrocarbons volatile at or above a temperature represented by that grade and condensable by the means used. It is made up in large part of highly-volatile matters, but contains also a considerable proportion of hydrocarbon suitable for use as illuminating-oil. These it is my object to separate, and this end I attain by the means and method hereinafter set forth. A practically-quantitative separation of the constituents is a point of the highest importance in view of the uses to which the materials are afterward to be devoted, and in view of recent legislation in many of the States of the Union. The more volatile hydrocarbons are mainly used for the manufacture of gas for use in carburetors and in so-called "self-generating gas-burners," in which cases the presence of comparatively-heavy or non-volatile oils is very objectionable by reason of their liability to condense. The contamination of the kerosene by volatile materials is still more undesirable in view of the law in many States prescribing a flashing instead of a burning test for illuminating-oils. A fluid may flash at 90° Fahrenheit, which will not burn at 120° Fahrenheit. Indeed, a very small proportion of highly-volatile hydrocarbon would make even whale-oil flash under proper conditions. It will thus be seen that a process of separation of the constituents of the distillate is valuable in proportion to the approximation to a complete separation secured thereby, the kerosene being uncontaminated with naphtha, benzine, or gasoline, and these being free from the presence of heavy oil. I secure this desirable end by causing the vapors of the distillate to pass through a series, one or more, of strata or diaphragms of water of a graduated temperature, effectually "knocking down" all vapors condensable at the temperature of the water and returning them to the still, and allowing the vapors that pass the diaphragms to flow to the condensers, and thence to the traps and tanks.

In the accompanying drawings, A is the still, which is of any desired form, and has a drum or dome, $a$, in its top, into which is inserted the column B, the lower end, $b'$, of which projects into the drum, as shown. About midway of the column are windows $b$, on opposite sides, through which the operation of the still may be observed.

C is the bend leading to the neck C'.

A steam-pipe, F, leads, through the medium of a branch, G, to a perforated pipe, $g$, within the still and near its bottom. The other branch of the steam-pipe is coiled, as shown at $e$, in the water-box E, and finds exit at $f$.

D' is the water-inlet pipe, and D D the outlet-pipes from the box E. These pipes are furnished with branches $d$, which lead at intervals into the column and neck, and open in the axis of the same and in a direction opposite to the current of effluent vapors. In the ends $m$ of the branches $d$ are spiders $n$, through which pass screw-rods $p$, armed with disks O and adjusting-nuts $o$. The current of water escaping from the pipe forms, according to a well-known principle of hydraulics, an umbrella-shaped diaphragm, L, as shown in Fig. 2, completely closing the column or neck with a water-seal. A return-pipe, $c$, connects the neck with the bottom of the still. Immediately beneath the end of the column is a funnel, I, from which a pipe, $i$, leads to the water-box H, which latter, as well as the still, is furnished with suitable outlet-pipes and cocks.

J is the gage-glass, in which I float a hydrometer, $l$, serving at once to indicate the level and quality of the residual contents of the still.

A condenser of any desired form is located between the neck and a suitable trap.

In operation, the material to be distilled being introduced into the still, heat is applied by means of steam led through the pipes G $g$ and into the contents of the still. The vapors of light hydrocarbons, which are immediately given off, pass up the column B. Water is led through the pipes D $d$, forming diaphragms L, which completely close the column and neck.

By properly regulating the temperature of the water through the medium of the steam-coil $e$ and using the necessary number of water-diaphragms, any desired product of distillation may be condensed in the column or neck, while the more volatile material, and it alone, passes on to the condenser.

Each of the pipes $d$ is furnished with a cock, so that any desired number of diaphragms of water may be used.

The peculiar manner in which the condensing-film is presented to the vapors secures most important results. The current of water forming the films or diaphragms flows from the center of the neck or column toward its walls and trickles or flows down the latter, so that all vapors condensed by the water are carried out of the way of the ascending vapors, and a fresh stratum of water is presented to the latter. By these means the temperature of the condensing agent is kept uniform. The water and condensed matter flow from the column B into the funnel I, my design in causing the end of the column to project within the still or drum, as at $b'$, being to prevent the liquids from running down the sides of the still. In the present case the water and oil flow through the pipe $i$ directly to the water-box H, where the water sinks and the oil floats up to the still to be redistilled.

An inclined stand-pipe or equivalent discharging device is used in connection with the water-box to carry off surplus water.

By the means described the water is carried quickly through the contents of the still by the pipe $i$, without in any material degree lowering the temperature of the oil, which it would do were it allowed to flow directly from the column into the still.

It is evident that by properly attempering the water, any desired constituent of the oil may be condensed in the condenser, and the distillates approximate nearly in purity to such as were heretofore only obtainable in the laboratory by the tedious and costly methods of fractional distillation, or by resorting to the agency of chemical affinities.

The combined gage-glass and hydrometer on the still (and a similar device may be applied to the trap) is a useful feature. It avoids the trouble heretofore attending the drawing-off of samples for test, as well as the wastage of the same and the danger of fire necessarily incident upon the exposure of the gasoline. The hydrometer, floating in the gage-glass and having for its counterpoise the bulb of an inclosed thermometer, indicates at once the temperature, level, and quality of the liquid.

The salient feature of my invention consists in subjecting the vapors to the condensing action of a film or films of flowing water, which water has an effect in that direction determined in its scope by the volume—i. e., the number of films, of water, and its temperature, conditions which are readily subject to control. The utmost facility is afforded for condensing any desired constituent of the oil, and effecting a practically quantitative separation of the same from the residual matter.

The device may be applied to a still of the usual form at a trifling expense, is simple in construction, and thoroughly efficient and satisfactory in operation.

I am aware that jets of water have been conducted into the columns of stills and delivered through roses in the form of spray or drops, and such I do not claim. The mechanism I have devised produces a diaphragm which completely closes the column, and contact of the vapors with the water is thereby safely insured—a result which does not necessarily follow from the use of spray or drops of water.

I am further aware that hydrocarbon vapors have been condensed by causing them to bubble through a body of water, and such I do not claim.

What I claim is—

1. The method herein described of separating the products of petroleum by distillation, consisting in subjecting the vapors to the condensing action of one or more diaphragms of water attempered to condense the desired constituent of the oil and permit the passage of the next more volatile constituent to the condenser, as set forth.

2. The method herein described of separating the products of petroleum by distillation, consisting in subjecting the vapors to the condensing action of a film or films or diaphragms of flowing water, and returning the condensed matter and water to the still for separation and redistillation of the oil, as set forth.

3. A still having a column provided with mechanism for completely closing the column by a diaphragm of flowing water, as set forth.

4. A still having in its column one or more axially-opening pipes provided with terminal disks, whereby, when a current of water is caused to flow through the pipes, a film or diaphragm of water completely closes the column, as set forth.

5. A still having a water-jet condenser in its column or neck, and a conduit beneath the neck for conducting the water and condensed oil to the bottom of the still, as set forth.

6. In combination with a still-body, a column having a jet-condenser, a conduit leading from the column to the bottom of the still, and a water-box or separator for eliminating the water and returning the oil to the still, as set forth.

7. In combination with the still having column and jet-condensers, the water-box E, pipes leading therefrom to the jets, steam-pipes F G $g$, and coil $e$, as set forth.

8. In combination with the still-body, the jet-condensers and column projecting at its lower end into the still, as set forth.

9. In combination with the still, the column B, having diaphragm jet-condensers, as set forth, the conduit $i$, and water-box H, as set forth.

10. In combination with the column or neck of a still, a water-pipe debouching in the axis of the said column or neck, and carrying at its end a disk, O, as set forth.

11. In combination with the column or neck and pipe $m$, the spider $n$, screw-rod $p$, and adjustable disk O, as set forth.

ALBERT NEILSON.

Witnesses:
R. D. WILLIAMS,
WM. SEEMULLER.